(12) United States Patent
Zhu et al.

(10) Patent No.: US 9,084,108 B2
(45) Date of Patent: Jul. 14, 2015

(54) METHOD, APPARATUS, AND SYSTEM FOR MOBILE VIRTUAL PRIVATE NETWORK COMMUNICATION

(75) Inventors: Quan Zhu, Beijing (CN); Dong Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 815 days.

(21) Appl. No.: 13/302,860

(22) Filed: Nov. 22, 2011

(65) Prior Publication Data

US 2012/0079113 A1 Mar. 29, 2012

Related U.S. Application Data

(63) Continuation of application No. PCT/CN2009/074976, filed on Nov. 17, 2009.

(30) Foreign Application Priority Data

May 27, 2009 (CN) .......................... 2009 1 0143618

(51) Int. Cl.
*G06F 15/173* (2006.01)
*H04W 8/26* (2009.01)
*H04L 29/06* (2006.01)
*H04L 29/12* (2006.01)
*H04W 40/24* (2009.01)
*H04W 76/02* (2009.01)
(Continued)

(52) U.S. Cl.
CPC .............. *H04W 8/26* (2013.01); *H04L 63/0272* (2013.01); *H04L 29/12226* (2013.01); *H04L 61/2015* (2013.01); *H04W 40/24* (2013.01); *H04W 76/02* (2013.01); *H04W 84/16* (2013.01); *H04W 88/16* (2013.01)

(58) Field of Classification Search
USPC .................................. 709/225, 245, 223, 220
See application file for complete search history.

(56) References Cited

U.S. PATENT DOCUMENTS

| 7,388,844 B1 | 6/2008 | Brown et al. |
| 2002/0129150 A1 | 9/2002 | Jung |
| 2005/0213562 A1 | 9/2005 | Chen |

(Continued)

FOREIGN PATENT DOCUMENTS

| CN | 1404263 A | 3/2003 |
| CN | 1473445 A | 2/2004 |

(Continued)

OTHER PUBLICATIONS

Korean Office Action received in Application No. 10-2011-7029643, Applicant: Huawei Technologies Co., Ltd., mailed May 30, 2013, 7 pages.

(Continued)

*Primary Examiner* — Lan-Dai T Truong
(74) *Attorney, Agent, or Firm* — Slater & Matsil, L.L.P.

(57) ABSTRACT

A mobile packet gateway obtains a network address of the terminal and a network address of a gateway virtual interface. The network address of the gateway virtual interface and the network address of the terminal belong to a same network segment. A virtual interface is created for a Packet Data Protocol Context (PDP context) of the MS according to the network address of the gateway virtual interface. A network segment address of a branch network served by the MS is obtained from the MS through the virtual interface according to a dynamic routing protocol.

24 Claims, 8 Drawing Sheets

(51) Int. Cl.
*H04W 84/16* (2009.01)
*H04W 88/16* (2009.01)

(56) References Cited

U.S. PATENT DOCUMENTS

| | | |
|---|---|---|
| 2005/0265366 A1 | 12/2005 | Ejiri |
| 2006/0171402 A1 | 8/2006 | Moore et al. |
| 2007/0110008 A1 | 5/2007 | Trift et al. |
| 2008/0102747 A1 | 5/2008 | Alam et al. |
| 2012/0079113 A1 | 3/2012 | Zhu et al. |

FOREIGN PATENT DOCUMENTS

| | | |
|---|---|---|
| CN | 1558614 A | 12/2004 |
| CN | 1835480 A | 9/2006 |
| CN | 101052022 A | 10/2007 |
| CN | 101052207 A | 10/2007 |
| CN | 101110745 A | 1/2008 |
| CN | 101127637 A | 2/2008 |
| CN | 101227471 A | 7/2008 |
| CN | 101399830 A | 4/2009 |
| CN | 101562807 A | 10/2009 |
| GB | 2 414 642 A | 11/2005 |
| JP | 2005-130049 A | 5/2005 |
| JP | 2005-341084 A | 12/2005 |
| WO | WO 03/084177 A1 | 10/2003 |

OTHER PUBLICATIONS

PCT International Search Report received in Patent Cooperation Treaty Application No. PCT/CN2009/074976, mailed Mar. 11, 2010, 6 pages.

PCT Written Opinion of the International Searching Authority received in Patent Cooperation Treaty Application No. PCT/CN2009/074976, mailed Mar. 11, 2010, 5 pages.

Notice of Reasons for Rejection received in Application No. 2012-512180, mailed Feb. 12, 2013, 8 pages.

European Search Report received in European Application No. 09845103.2, mailed Jun. 28, 2012, 7 pages.

Notice of Allowance for JP Application No. 2012-512180 dated Oct. 15, 2013, 2 pages.

Kato et al., "Mobile VPN with SIP signaling on Next Generation Network," IEICE Technical Report IN2007-45 (Sep. 2007), 7 pages.

METHOD, APPARATUS, AND SYSTEM FOR MOBILE VIRTUAL PRIVATE NETWORK COMMUNICATION

This application is a continuation of International Application No. PCT/CN2009/074976, filed on Nov. 17, 2009, which claims priority to Chinese Patent Application No. 200910143618.2, filed on May 27, 2009, both of which are hereby incorporated by reference in their entireties.

TECHNICAL FIELD

The present invention relates to the communications field, and in particular, to a method, an apparatus, and a system for mobile virtual private network communication.

BACKGROUND

A Virtual Private Network (VPN) is a technology of establishing a private data communication network in a public network relying on an Internet Service Provider (ISP) and a Network Service Provider (NSP). According to networking types, the VPN may be divided into a fixed VPN and a mobile VPN. The fixed VPN provides users with VPN access through a fixed communication network, while the mobile VPN provides users with VPN access through such mobile communication networks as a General Packet Radio Service (GPRS) network/Wide-brand Code Division Multiplex Access (WCDMA) network/Code Division Multiplex Access (CDMA) network/Long Term Evolution-System Architecture Evolution (LTE-SAE) network.

In the mobile VPN, a Mobile Subscriber (MS) may need to act as an MS router to serve a mobile VPN branch network. In this case, a mobile packet gateway needs to obtain both an IP address of the MS (a network address) and information about a network segment IP address of the mobile VPN branch network served by the MS. Therefore, the IP address of the MS and the network segment IP address of the mobile VPN branch network may be associated with a same Packet Data Protocol Context (PDP context). In this way, the MS and all hosts of the mobile VPN branch network exchange IP traffic with an external device through the associated PDP context by using their respective IP addresses.

In the prior art, the mobile packet gateway obtains the IP address of the MS and the network segment IP address of the mobile VPN branch network served by the MS through an Authentication Authorization Accounting Server (AAA Server). When the MS is activated, the mobile packet gateway sends a Radius Access Request message to the AAA Server according to presetting; after determining that the MS enables an MS Router function, the AAA Server adds the pre-stored IP address of the MS and the network segment IP address of the mobile VPN branch network served by the MS to a Radius Access Accept message, and returns the Radius Access Accept message to the mobile packet gateway; the mobile packet gateway obtains the IP address of the MS and the network segment IP address of the mobile VPN branch network from the Radius Access Accept message.

During the implementation of mobile VPN communication, the inventor discovers at least the following problems in the prior art: According to technical solutions in the prior art, the information about the network segment IP address of the mobile VPN branch network stored on the AAA Server is pre-configured, however, the mobile VPN branch network served by the MS changes frequently; therefore, the information about the network segment IP address of the mobile VPN branch network stored on the AAA Server needs to be changed manually and frequently, so that the mobile packet gateway may perform the mobile VPN communication according to a new network segment IP address of the mobile VPN branch network. Therefore, network maintenance efficiency is low in the prior art.

SUMMARY OF THE INVENTION

Embodiments of the present invention provide a method, an apparatus, and a system for mobile Virtual Private Network (VPN) communication to increase network maintenance efficiency.

To achieve the foregoing objective, the embodiments of the present invention provide the following technical solutions.

A method for mobile VPN communication includes obtaining a network address of a terminal and a network address of a gateway virtual interface, where the network address of the gateway virtual interface and the network address of the terminal belong to a same network segment. A virtual interface for a Packet Data Protocol Context (PDP context) of a Mobile Subscriber (MS) is created according to the network address of the gateway virtual interface. The network address of the terminal is sent to the MS. A network segment address of a branch network served by the MS from the MS through the virtual interface is obtained according to a dynamic routing protocol.

An apparatus for mobile VPN communication includes a network address obtaining unit that is configured to obtain a network address of a terminal and a network address of a gateway virtual interface. The network address of the terminal and the network address of the gateway virtual interface belong to a same network segment.

An interface creating unit is configured to create a virtual interface for a PDP context of an MS according to the network address of the gateway virtual interface obtained by the network address obtaining unit. A network address sending unit is configured to send the network address of the terminal obtained by the network address obtaining unit to the MS. A branch address obtaining unit is configured to obtain, according to a dynamic routing protocol, a network segment address of a branch network served by the MS from the MS through the virtual interface created by the interface creating unit.

A method for mobile VPN communication includes obtaining a network address of a terminal from a mobile packet gateway. A network address of a gateway virtual interface of the mobile packet gateway is obtained according to the network address of the terminal. The network address of the gateway virtual interface and the network address of the terminal belong to a same network segment. The mobile packet gateway of a network segment address of a served branch network is notified, according to a dynamic routing protocol through a virtual interface that possesses the network address of the gateway virtual interface.

An MS includes a terminal address obtaining unit that is configured to obtain a network address of a terminal from a mobile packet gateway. An interface address obtaining unit is configured to obtain a network address of a gateway virtual interface of the mobile packet gateway according to the network address of the terminal obtained by the terminal address obtaining unit. The network address of the gateway virtual interface and the network address of the terminal belong to a same network segment. A branch address notifying unit is configured to notify, according to a dynamic routing protocol, the mobile packet gateway of a network segment address of a served branch network through a virtual interface that possesses the network address of the gateway virtual interface.

A system for mobile VPN communication includes at least one MS and a mobile packet gateway.

The mobile packet gateway is configured to obtain a network address of a terminal and a network address of a gateway virtual interface, where the network address of the gateway virtual interface and the network address of the terminal belong to a same network segment; create a virtual interface for a PDP context of the MS according to the network address of the gateway virtual interface; send the network address of the terminal to the MS; and obtain, according to a dynamic routing protocol, a network segment address of a branch network served by the MS from the MS through the virtual interface.

The MS is configured to obtain the network address of the terminal from the mobile packet gateway; obtain the network address of the gateway virtual interface of the mobile packet gateway according to the network address of the terminal, where the network address of the gateway virtual interface and the network address of the terminal belong to the same network segment; and notify the mobile packet gateway of the network segment address of the served branch network through a virtual interface that possesses the network address of the gateway virtual interface according to the dynamic routing protocol.

According to the method, apparatus, and system for mobile VPN communication provided in the embodiments of the present invention, the mobile packet gateway creates a virtual interface for the PDP context of the MS, where the virtual interface and the MS each are configured with a network address of the same network segment; the mobile packet gateway may, in real time, obtain a latest network segment address of the branch network served by the MS from the MS through the virtual interface according to the dynamic routing protocol. Therefore, by using the technical solutions provided in embodiments of the present invention, the problem that the network segment address of the branch network on the AAA Server needs to be modified manually when the network segment address of the mobile VPN branch network served by the MS changes is solved. Further, the network maintenance efficiency is increased.

BRIEF DESCRIPTION OF THE DRAWINGS

To make the technical solutions in the embodiments of the present invention clearer, accompanying drawings for illustrating the embodiments of the present invention are described below. Evidently, the accompanying drawings described below are only some exemplary embodiments of the present invention, and those skilled in the art may derive other drawings from such accompanying drawings without creative efforts.

DETAILED DESCRIPTION OF ILLUSTRATIVE EMBODIMENTS

The technical solutions in the embodiments of the present invention are described clearly and completely below with reference to the accompanying drawings. Apparently, the embodiments described below are merely part of rather all of the embodiments of the present invention. Persons skilled in the art may derive other embodiments from the embodiments of the present invention without making creative efforts, and all such embodiments shall fall within the protection scope of the present invention.

Figure 1:
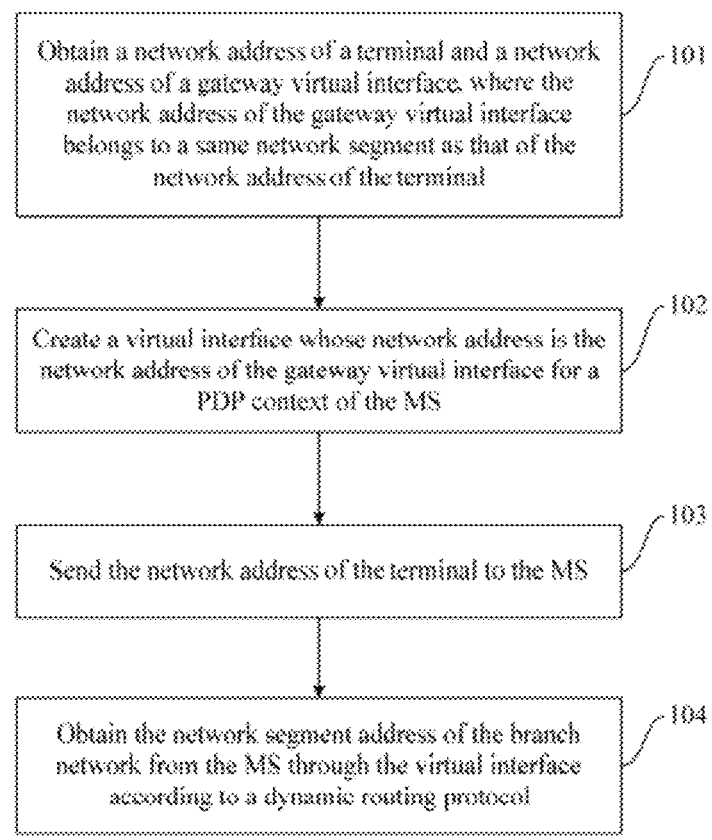
FIG. 1 is a flowchart of a method for mobile VPN communication according to an embodiment of the present invention.

To increase network maintenance efficiency, an embodiment of the present invention provides a method for mobile VPN communication. As shown in FIG. 1, the method for mobile VPN communication includes:

Step 101: A mobile packet gateway obtains a network address of a terminal and a network address of a gateway virtual interface, where the network address of the gateway virtual interface and the network address of the terminal belong to a same network segment.

Several concepts mentioned in this embodiment of the present invention are described as follows: "network address of the terminal" refers to a network address that the mobile packet gateway allocates to an MS; and "network address of a gateway virtual interface" refers to a network address that the mobile packet gateway allocates to a created virtual interface.

In this step, after receiving an activation request sent by the MS, the mobile packet gateway may obtain both the network address of the terminal and the network address of the gateway virtual interface concurrently, or the mobile packet gateway may first obtain the network address of the terminal and a network segment address of a branch network served by the MS from an AAA Server according to the prior art, and then obtain the network address of the gateway virtual interface which is in the same network segment as the network address of the terminal according to the network address of the terminal in a follow-up process.

Step 102: The mobile packet gateway creates a virtual interface for a PDP context of the MS according to the network address of the gateway virtual interface.

Step 103: The mobile packet gateway sends the network address of the terminal to the MS.

Step 102 and step 103 may be executed concurrently, or step 102 may be executed first and then step 103 may be executed, or step 103 may be executed first and then step 102 may be executed.

Step 104: The mobile packet gateway obtains, according to a dynamic routing protocol, the network segment address of the branch network served by the MS from the MS through the virtual interface.

The network address of the gateway virtual interface and the network address of the terminal belong to the same network segment. Therefore, after the dynamic routing protocol is used on the virtual interface of the mobile packet gateway and an interface of the MS each, the mobile packet gateway and the MS may exchange a dynamic routing protocol message through the virtual interface and the interface of the MS. The dynamic routing protocol message that the MS sends to the mobile packet gateway includes the network segment address of the branch network. Therefore, the mobile packet gateway may, in real time, obtain the network segment address of the branch network from the dynamic routing protocol message sent from the MS. When the network segment address of the branch network changes, the network segment address of the branch network included in the dynamic routing protocol message that the MS sends to the mobile packet gateway may also change. The mobile packet gateway may obtain the changed network segment address of the branch network by receiving, through the virtual interface, the dynamic routing protocol message sent from the MS, therefore obtaining a new network segment address of the branch network in real time.

Before obtaining the network segment address of the branch network from the MS through the virtual interface according to the dynamic routing protocol, the mobile packet gateway may send an activation response that includes the network address of the terminal to the MS. In this way, the MS forwards IP traffic through an associated PDP context by using the network address of the terminal, and notifies the mobile packet gateway of the network segment address of the branch network by using the network address of the terminal.

In the method for mobile VPN communication provided in this embodiment of the present invention, the following technical solution is used: the mobile packet gateway obtains a latest network segment address of the branch network from the MS through the virtual interface according to the dynamic routing protocol in real time. Therefore, the problem that the network segment address of the branch network on the AAA Server needs to be modified manually when the network segment address of the mobile VPN branch network served by the MS changes is prevented. Further, the network maintenance efficiency is increased.

In the preceding embodiment, the mobile packet gateway may obtain both the network address of the terminal and the network address of the gateway virtual interface concurrently by using at least following three solutions: The mobile packet gateway obtains the network address of the terminal and the network address of the gateway virtual interface through the AAA Server; the mobile packet gateway obtains the network address of the terminal and the network address of the gateway virtual interface locally; the mobile packet gateway obtains the network address of the terminal and the network address of the gateway virtual interface through a Dynamic Host Configuration Protocol Server (DHCP server). The following further describes the method with reference to the preceding three solutions and the preceding embodiment.

Solution 1: A mobile packet gateway obtains a network address of a terminal and a network address of a gateway virtual interface through an AAA Server.

Figure 3:
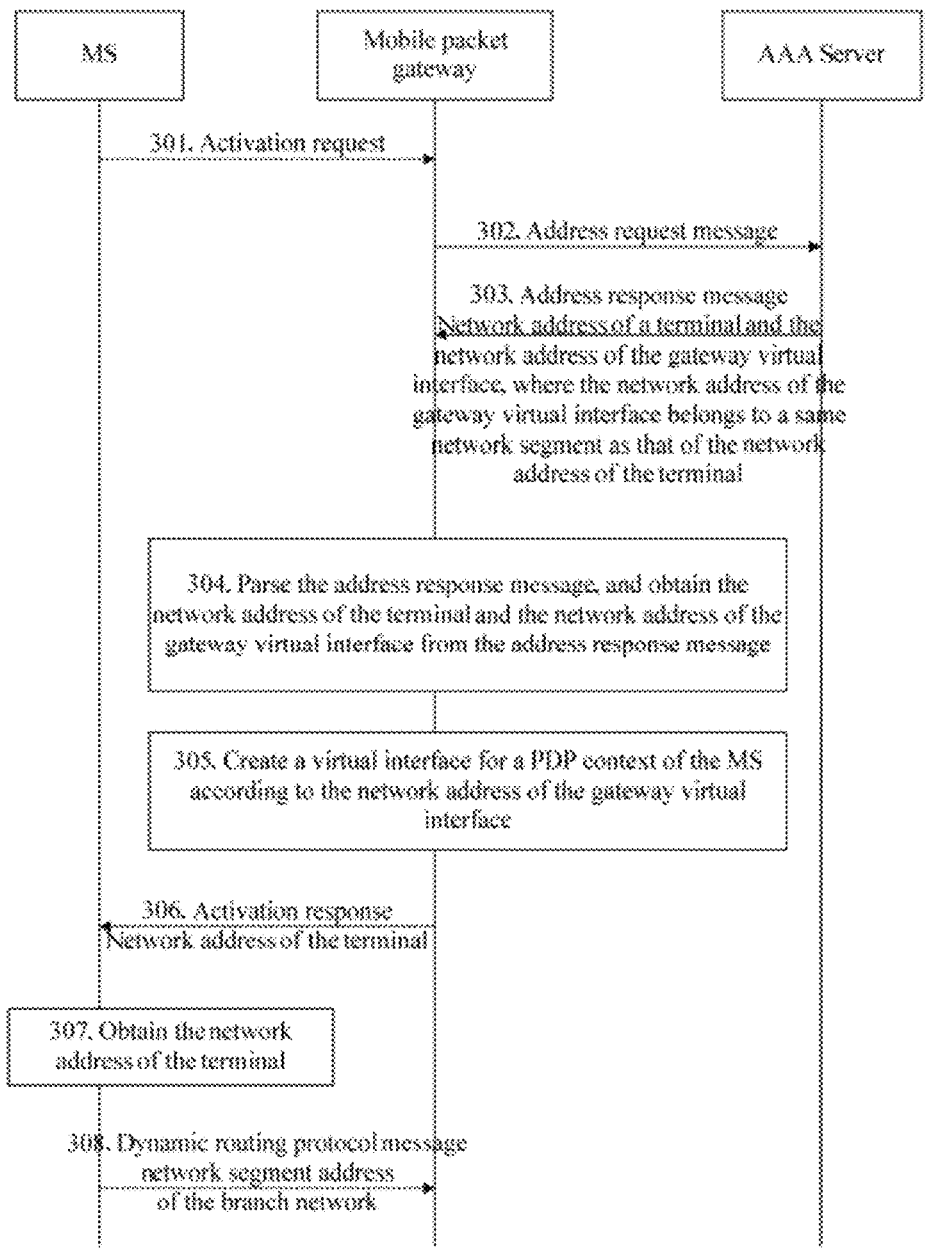
FIG. 3 is a flowchart of another method for mobile VPN communication according to an embodiment of the present invention.

As shown in FIG. 3, an embodiment of the present invention provides a method for mobile VPN communication, where the method includes the following steps.

Step 301: An MS sends an activation request to a mobile packet gateway.

The activation request refers to a PDP context activation request. For example, in actual applications, the process of sending, by the MS, the activation request to the mobile packet gateway (for example, GGSN, that is, Gateway GPRS Support Node, where GPRS is short for General Packet Radio Service,) may include the following steps:

(1) The MS sends a PDP context activation request to a Serving GPRS Support Node (SGSN), where the activation request includes an Access Point Name (APN).

(2) The SGSN judges the accessibility of the MS according to the APN, obtains a corresponding GGSN address through a Domain Name System Server (DNS server), and forwards the PDP context activation request of the MS to the GGSN.

Step 302: After receiving the activation request from the MS, the mobile packet gateway sends an address request message to an AAA Server.

The address request message may be implemented in various forms, for example, a Radius Access Request message.

Step 303: The AAA Server sends an address response message to the mobile packet gateway.

In the method provided in this embodiment of the present invention, the AAA Server pre-stores a network address of a terminal, that is, an IP address of the MS and a network mask. When the MS enables an MS Router function, the AAA Server also stores a network address of a corresponding gateway virtual interface, where the network address of the gateway virtual interface is one of the IP addresses of the mobile packet gateway. The network address of the gateway virtual interface is used to interconnect with the MS and start a dynamic routing protocol. In addition, the network address of the gateway virtual interface and the network address of the terminal belong to a same network segment.

If the MS enables the MS Router function, the AAA Server adds the stored network address of the terminal and the network address of the corresponding gateway virtual interface to the address response message, and sends the address response message to the mobile packet gateway. If the MS does not enable the MS Router function, the AAA Server adds the stored network address of the terminal to the address response message, and sends the address response message to the mobile packet gateway.

The address response message may have multiple implementation forms, for example, when the address request message is implemented through the Radius Access Request message, the address response message may implemented through a Radius Access Accept message. In addition, information such as the IP address of the MS may adopt multiple forms in the Radius Access Accept message. A private extension attribute may be used, for example, a "Vendor-Specific" attribute defined in an RFC2865 may be customized to include information such as the IP address of the MS. Or, standard attributes defined in the RFC2865 may be used, for example, "Framed-IP-Address", "Framed-IP-Netmask", and "Framed-Route" attributes, where the "Framed-IP-Address" and "Framed-IP-Netmask" attributes include the IP address of the MS and the network mask of the MS respectively, and the "Gateway address" field in the "Framed-Route" attribute includes the network address of the gateway virtual interface. The network address of the gateway virtual interface belongs to the same network segment as that of the IP address of the MS represented by the "Framed-IP-Address" and "Framed-IP-Netmask" attributes.

Step 304: The mobile packet gateway parses the address response message, and obtains the network address of the terminal and the network address of the gateway virtual interface from the address response message.

The mobile packet gateway parses the address response message. When determining that the MS enables the MS Router function, the mobile packet gateway obtains the network address of the terminal and the network address of the gateway virtual interface from the address response message; when determining that the MS does not enable the MS Router function, the mobile packet gateway obtains the network address of the terminal from the address response message.

In this step, the mobile packet gateway may judge whether the MS enables the MS Router function according to whether the address response message includes the network address of the gateway virtual interface. For example, when the network address of the gateway virtual interface is included in the "Gateway address" field in the "Framed-Route" attribute of the Radius Access Accept message, the mobile packet gateway determines that the MS enables the MS Router function only when the Radius Access Accept message includes the "Framed-Route" attribute.

In addition, the mobile packet gateway may also judge whether the MS enables the MS Router function according to whether the address response message includes an MS Router flag or a value of the MS Router flag.

Step 305: The mobile packet gateway creates a virtual interface for a PDP context of the MS according to the network address of the gateway virtual interface.

When the MS enables the MS Router function, the mobile packet gateway obtains a PDP context associated with the network address of the terminal, that is, the PDP context of the MS. The mobile packet gateway creates a virtual interface for the PDP context. The network address of the virtual interface is the network address of the gateway virtual interface. The mobile packet gateway may encapsulate and decapsulate an IP message passing the virtual interface in a user plane tunnel corresponding to the PDP context.

Step 306: The mobile packet gateway sends an activation response that includes the network address of the terminal to the MS.

For example, in actual applications, the process of sending the activation response to the MS by the mobile packet gateway (for example, the GGSN) includes: The GGSN sends an activation response that includes the IP address of the MS and the network mask of the MS to the SGSN; the SGSN forwards the activation response to the MS.

Step 307: After receiving the activation response, the MS obtains the network address of the terminal from the activation response.

Step 308: The MS obtains the network address of the gateway virtual interface of the mobile packet gateway according to the network address of the terminal, where the network address of the gateway virtual interface and the network address of the terminal belong to the same network segment. The MS notifies the mobile packet gateway of the network segment address of a branch network served by the MS through a virtual interface that possesses the network address of the gateway virtual interface according to the dynamic routing protocol.

(1) The MS may obtain the network segment address of the branch network served by the MS in at least two ways. Way 1: The MS may pre-configure the network segment address of the branch network on the MS; way 2: The dynamic routing protocol may be used between the MS and each host of the mobile VPN branch network served by the MS; in this case, the MS may obtain the network segment address of the branch network served by the MS according to the dynamic routing protocol. In way 2, because the dynamic routing protocol is used between the MS and each host of the mobile VPN branch network served by the MS, the MS and each host of the mobile VPN branch network served by the MS are mutually neighbor nodes. In the dynamic routing protocol, some dynamic routing protocol messages may be exchanged between the neighbor nodes. These dynamic routing protocol messages include route information of the network. Therefore, the MS may exchange dynamic routing protocol messages with each host of the mobile VPN branch network served by the MS, and obtain the route information of the branch network from the dynamic routing protocol messages, where the route information of the branch network includes the network segment address of the branch network, that is, the network segment IP address of the mobile VPN branch network.

(2) The virtual interface created by the mobile packet gateway and the network address of the terminal of the MS belong to the same network segment. Therefore, a dynamic routing protocol may be used on the virtual interface and the interface of the MS each, for example, an Open Shortest Path First (OSPF) or a Routing information Protocol (RIP). Then, the mobile packet gateway and the MS find that they are neighbor nodes. In this way, the MS knows the network address of the gateway virtual interface according to the dynamic routing protocol, and further exchanges the route information.

The mobile packet gateway exchanges a dynamic routing protocol message with the MS through the created virtual interface and the interface of the MS. After the MS obtains the network segment address of the branch network from the dynamic routing protocol message sent from a host of the mobile VPN branch network served by the MS or according to the pre-configurations, the MS includes the network segment address of the branch network in the dynamic routing protocol message sent to the mobile packet gateway. In this way, the mobile packet gateway may obtain the network segment address of the branch network from the dynamic routing protocol message.

After obtaining the network segment address of the mobile VPN branch network served by the MS, the mobile packet gateway determines the PDP context associated with the network address of the MS, and associates the network segment address of the branch network with the PDP context. In this way, the mobile packet gateway may transmit traffic of the network segment address through a user plane tunnel corresponding to the associated PDP context, therefore achieving VPN communication for the traffic of the network segment address. The mobile packet gateway may also encapsulate and decapsulate a dynamic routing protocol message passing the virtual interface in the user plane tunnel corresponding to the associated PDP context.

Therefore, in a process of forwarding uplink service traffic, the mobile packet gateway may forward the IP traffic through the associated PDP context when a source address of the IP traffic is permitted to be the IP address of the MS or the network segment IP address of the mobile VPN branch network. In addition, in a process of forwarding downlink service traffic, the mobile packet gateway may forward the IP traffic through the associated PDP context when a destination address of the IP traffic is permitted to be the IP address of the MS or the network segment IP address of the mobile VPN branch network.

Because the information about the network segment IP address of the mobile VPN branch network is pre-configured in the prior art, the VPN branch network and headquarters network cannot know one another' network topologies. However, in this embodiment of the present invention, the mobile VPN branch network and headquarters network each may obtain one another' network topologies so as to dynamically adjust a flow direction of the IP traffic. Specifically, the dynamic routing protocol may also be used between the mobile packet gateway and the mobile VPN headquarters network. In this way, the mobile packet gateway may obtain the network topology of the mobile VPN branch network from the dynamic routing protocol message exchanged between the mobile packet gateway and the MS, and notify the mobile VPN headquarters network of the obtained network topology of the mobile VPN branch network through the dynamic routing protocol message. In addition, the mobile packet gateway may obtain the network topology of the mobile VPN headquarters network from the dynamic routing protocol message exchanged between the mobile VPN headquarters network and the mobile packet gateway, and notify the MS of the obtained network topology of the mobile VPN headquarters network through the dynamic routing protocol message. Further, the MS notifies the mobile VPN branch network of the network topology of the mobile VPN headquarters network.

Furthermore, the mobile packet gateway may exchange network monitoring information with the MS through the virtual interface, and detect quality of a network with the MS according to the network monitoring information. If detecting that the quality of network between the mobile packet gateway and the MS is poor, the mobile packet gateway may perform corresponding adjustment immediately. Certainly, other standard or non-standard customized communication may also be used between the mobile packet gateway and the MS to transfer other information.

In this embodiment, when the IP address of the VPN branch network changes, the changed address information may be configured on the MS or obtained by the MS according to the dynamic routing protocol. In addition, the MS includes the changed network segment address of the branch network in the dynamic routing protocol message sent to the mobile packet gateway. In this way, the mobile packet gateway may obtain the changed network segment address of the branch network from the dynamic routing protocol message.

Figure 11:
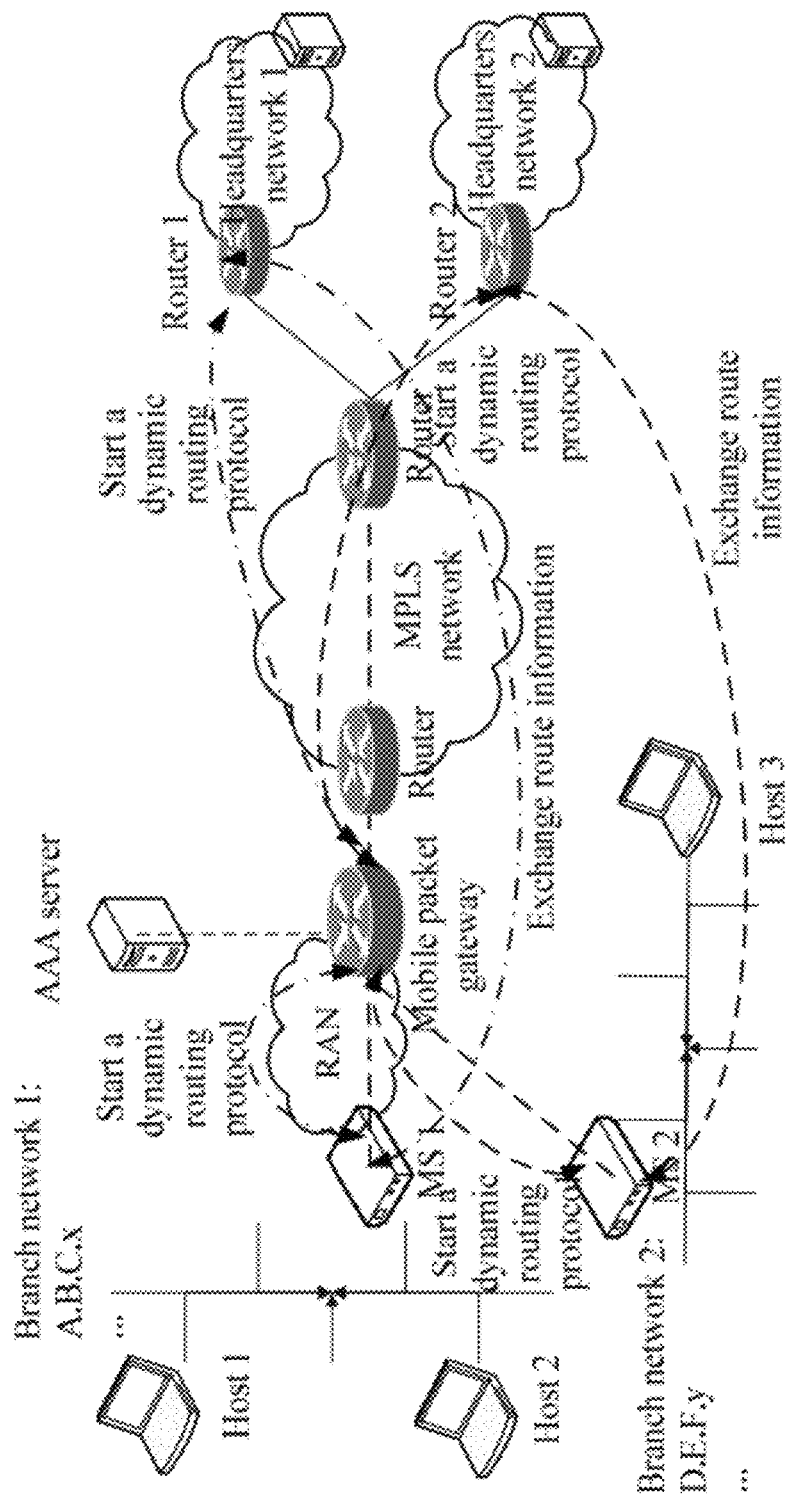
FIG. 11 is a networking diagram of a method for mobile VPN communication when a first solution is used according to an embodiment of the present invention.

FIG. 11 is a networking diagram of a method for mobile VPN communication when the preceding first solution is used according to an embodiment of the present invention. The mobile packet gateway creates a virtual interface for each of an MS 1 and an MS 2 that enable the MS Router function. Dynamic routing protocol messages between the MS 1/MS 2 and the mobile packet gateway pass their respective created virtual interfaces, that is, the dynamic routing protocol messages are transmitted through a user plane tunnel corresponding to the PDP context of the MS 1 and the MS 2. The MS may be connected to the mobile packet gateway through a radio access network (RAN).

After the MS 1 sends a dynamic routing protocol message to the mobile packet gateway, the mobile packet gateway receives and parses the dynamic routing protocol message. If a destination IP address of the IP message received by the mobile packet gateway subsequently is located within a network segment A.B.C.x of a branch network 1, the mobile packet gateway knows that a next hop address of the IP message is an IP address allocated to the MS 1 after the MS 1 is activated. In addition, after the MS 2 sends the dynamic routing protocol message to the mobile packet gateway, the mobile packet gateway receives and parses the dynamic routing protocol message. If the destination IP address of the IP message received by the mobile packet gateway subsequently is located within a network segment D.E.F.y of a branch network 2, the mobile packet gateway knows that a next hop address of the IP message is an IP address allocated to the MS 2 after the MS 2 is activated.

After the mobile packet gateway sends the dynamic routing protocol message to the MS 1, the MS 1 receives and parses the dynamic routing protocol message. If the destination IP address of the IP message received by the MS 1 subsequently is located within a network segment of a headquarters network 1, the MS 1 knows that a next hop address of the IP message is a virtual interface IP address of the mobile packet gateway, where the virtual interface IP address of the mobile packet gateway belongs to the same network segment as that of the network address of the MS 1. In addition, after the mobile packet gateway sends the dynamic routing protocol message to the MS 2, the MS 2 receives and parses the dynamic routing protocol message. If the destination IP address of the IP message received by the MS 2 subsequently is located within a network segment of a headquarters network 2, the MS 2 knows that a next hop address of the IP message is a virtual interface IP address of the mobile packet gateway, where the virtual interface IP address of the mobile packet gateway belongs to the same network segment as that of the network address of the MS 2.

After receiving the dynamic routing protocol message sent from the MS 1 and the MS 2 each, the mobile packet gateway may obtain information about a network segment IP address (A.B.C.x and D.E.F.y) and other route information that are of the branch network 1 and the branch network 2 from these dynamic routing protocol messages respectively. However, after the MS 1 and the MS 2 each receive the dynamic routing protocol message sent from the mobile packet gateway, the MS 1 and the MS 2 may obtain the information about the network segment IP address and other route information that are of the headquarters network 1 and the headquarters network 2 from these dynamic routing protocol messages respectively.

In addition, a route protocol message is exchanged between the MS 1 and the mobile packet gateway, and between the mobile packet gateway and a router 1 of the headquarters network 1. In this way, the MS 1 and the router 1 of the headquarters network 1 may obtain one another' route information. Therefore, logically, the MS 1 and the router 1 of the headquarters network 1 may exchange one another' route information to dynamically adjust the flow direction of the traffic, as shown by the dashed line between the MS 1 and the router 1 in the figure. Similarly, logically, the MS 2 and the router 2 of the headquarters network 2 may also exchange one another' route information to dynamically adjust the flow direction of the traffic, as shown by the dashed line between the MS 2 and the router 2 in the figure. It may be understandable that exchanging a route protocol message between the mobile packet gateway and the router of the headquarters network is implemented completely on the basis of the prior art, and is not further described here.

After obtaining the route information, the mobile packet gateway permits IP traffic that uses the A.B.C.x and the D.E.F.y as the source addresses to be transmitted through the user plane tunnel corresponding to the PDP context of the MS 1 and the MS 2, and permits IP traffic that uses the A.B.C.x and the D.E.F.y as the destination addresses to be transmitted through the user plane tunnel corresponding to the PDP context of the MS 1 and the MS 2. Therefore, mobile VPN traffic is normally forwarded.

It may be understandable that according to the conventional routing technology, if the branch network 1 and the branch network 2 belong to the same VPN, the network segment address of the branch network 1 and the branch network 2 should not belong to the same network segment. Accordingly, the IP address of the MS 1 and the IP address of the MS 2 do not belong to the same network segment.

Solution 2: A mobile packet gateway obtains a network address of the terminal and a network address of a gateway virtual interface locally.

Figure 4:
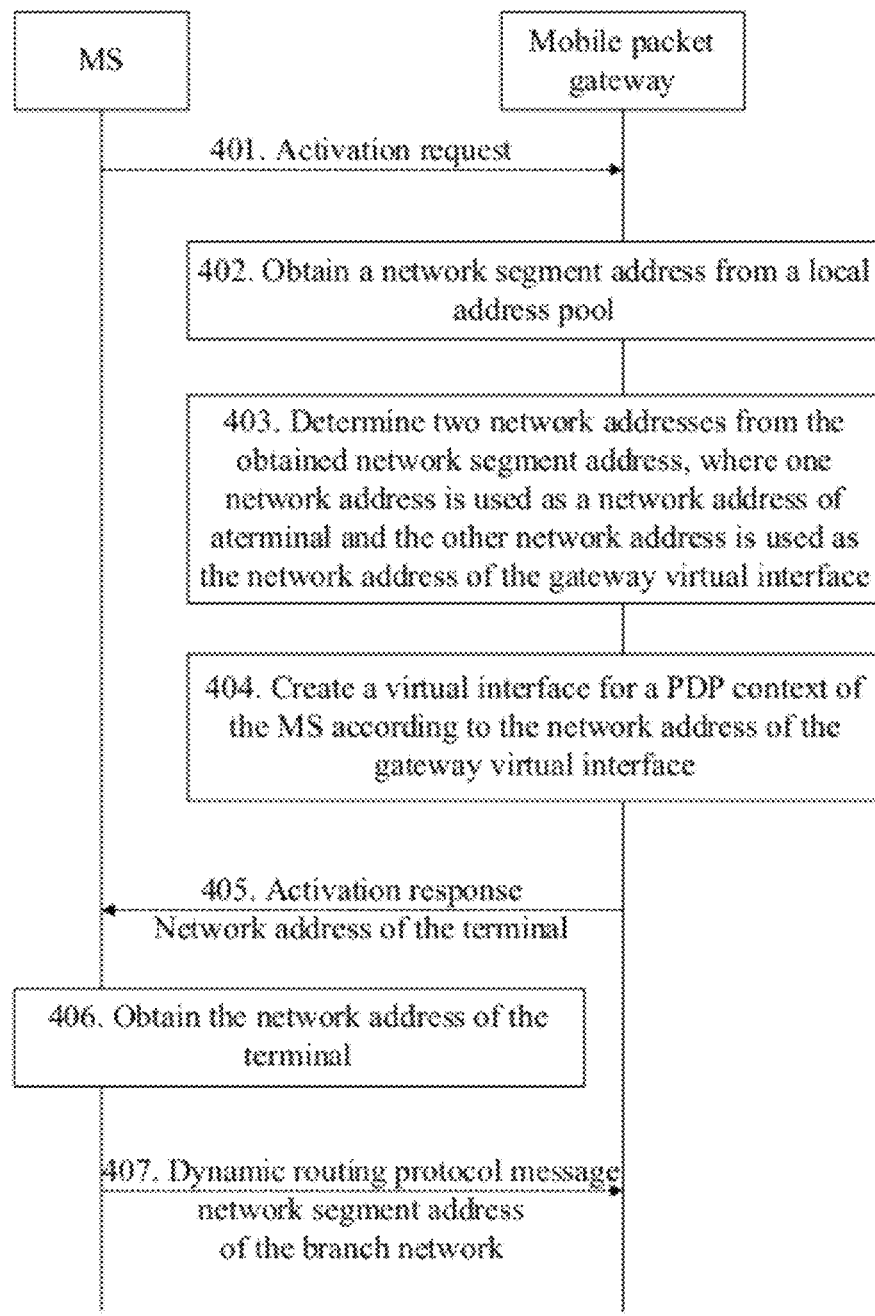
FIG. 4 is a flowchart of another method for mobile VPN communication according to an embodiment of the present invention.

As shown in FIG. 4, an embodiment of the present invention provides a method for mobile VPN communication, where the method includes the following steps.

Step 401 is the same as step 301.

Step 402: After receiving the activation request from the MS, the mobile packet gateway obtains a network segment address from a local address pool when the MS enables an MS Router function.

The mobile packet gateway pre-stores configuration information about whether the MS enables the MS Router function. Therefore, after receiving the activation request from the MS, the mobile packet gateway determines, according to the stored configuration information, whether the MS enables the MS Router function; or when a user initiates an authentication request to an AAA Server, the mobile packet gateway knows that the MS enables the MS Router function from the AAA Server.

When determining that the MS enables the MS Router function, the mobile packet gateway obtains a network segment IP address from the local address pool. For example, in the IPV4, a length of a corresponding network segment mask generally does not exceed 30, or the length of a network segment mask may be pre-specified.

Step 403: The mobile packet gateway determines two network addresses from the obtained network segment address, and uses one network address as the network address of the terminal that the mobile packet gateway allocates to the MS and the other one as the network address of the gateway virtual interface.

Steps 404 to 407 are the same as step 305 to 308. In addition, the principles and processes of exchanging route information and achieving normal forwarding of mobile VPN service traffic are the same as those in the first solution.

Solution 3: A mobile packet gateway obtains a network address of a terminal and a network address of a gateway virtual interface through a DHCP server.

Figure 5:
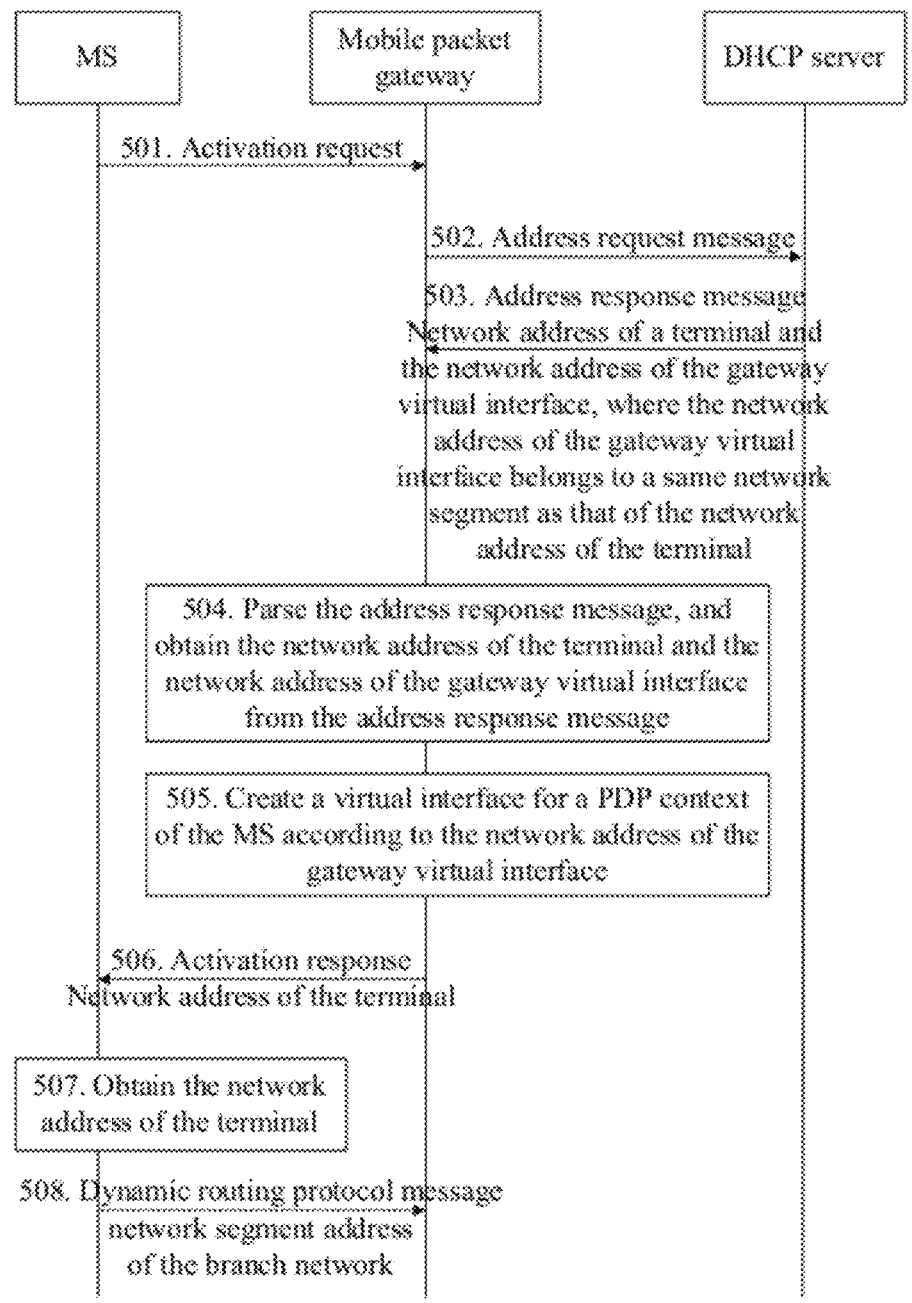
FIG. 5 is a flowchart of another method for mobile VPN communication according to an embodiment of the present invention.

As shown in FIG. 5, an embodiment of the present invention provides a method for mobile VPN communication, where the method includes the following steps:

Step 501 is the same as step 301.

Step 502: After receiving the activation request from the MS, the mobile packet gateway sends an address request message to a DHCP server.

The address request message may adopt various forms, for example, a DHCP REQUEST message.

Step 503: The DHCP server sends an address response message to the mobile packet gateway.

In this method, the DHCP server pre-stores a network address of a terminal, that is, an IP address of the MS and a network mask. When the MS enables an MS Router function, the DHCP server also stores a network address of a corresponding gateway virtual interface, that is, an IP address of the mobile packet gateway interconnected with the MS. In addition, the network address of the gateway virtual interface and the network address of the terminal belong to a same network segment.

If the MS enables the MS Router function, the DHCP server adds the stored network address of the terminal and the network address of the corresponding gateway virtual interface to the address response message, and sends the address response message to the mobile packet gateway. If the MS does not activate the MS Router function, the DHCP server adds the stored network address of the terminal to the address response message, and sends the address response message to the mobile packet gateway.

The address response message may have multiple implementation forms, for example, when the address request message is implemented through the DHCP REQUEST message, the address response message may be implemented through a DHCP OFFER/DHCP ACK message. In addition, if information such as the IP address of the MS is included in the DHCP OFFER/DHCP ACK message in various ways, for example, a private extension attribute may be used. For example, the "OPTIONS" attribute defined in the RFC2131 is customized to include information such as the IP address of the MS.

Step 504: The mobile packet gateway parses the address response message, and obtains the network address of the terminal and the network address of the gateway virtual interface from the address response message.

The mobile packet gateway parses the address response message. When determining that the MS enables the MS Router function, the mobile packet gateway obtains the network address of the terminal and the network address of the gateway virtual interface from the address response message; when determining that the MS does not activate the MS Router function, the mobile packet gateway obtains the network address of the terminal from the address response message.

In this step, the mobile packet gateway may judge whether the MS enables the MS Router function according to whether the address response message includes the network address of the gateway virtual interface. Alternatively, the mobile packet gateway may judge whether the MS enables the MS Router function according to whether the address response message includes an MS Router flag or a value of the MS Router flag.

Steps 505 to 508 are the same as step 305 to 308. In addition, the principles and processes of exchanging route information and achieving normal forwarding of mobile VPN service traffic are the same as those in the first solution.

In the method for mobile VPN communication provided in this embodiment of the present invention, the following technical solution is used: the mobile packet gateway obtains a latest network segment address of the branch network from the MS through the virtual interface according to the dynamic routing protocol in real time. Therefore, the problem that the network segment address of the branch network on the AAA Server needs to be modified manually when the network segment address of the mobile VPN branch network served by the MS changes is prevented. Further, the network maintenance efficiency is increased.

In addition, the mobile packet gateway may obtain the latest network segment address of the branch network through the virtual interface at any time. Therefore, the problem that the mobile packet gateway can obtain the latest network segment address of the branch network only when the MS is re-activated is solved. In this way, the operability of the network maintenance is further improved, and the timeliness of the network segment address of the branch network stored in the mobile packet gateway is guaranteed.

Furthermore, the technical solutions of exchanging a dynamic routing protocol message between the mobile packet gateway and the MS and between the mobile packet gateway and the mobile VPN headquarters network may be used to solve the problem of improper traffic configurations due to failure to timely adjust a flow direction of the IP traffic between the mobile VPN branch network and the headquarters network according to the change of the network topology. Therefore, the mobile VPN branch network and the headquarters network may dynamically adjust the flow direction of the IP traffic according to their respective obtained network topologies, thereby making the traffic configuration more reasonable.

Figure 2:
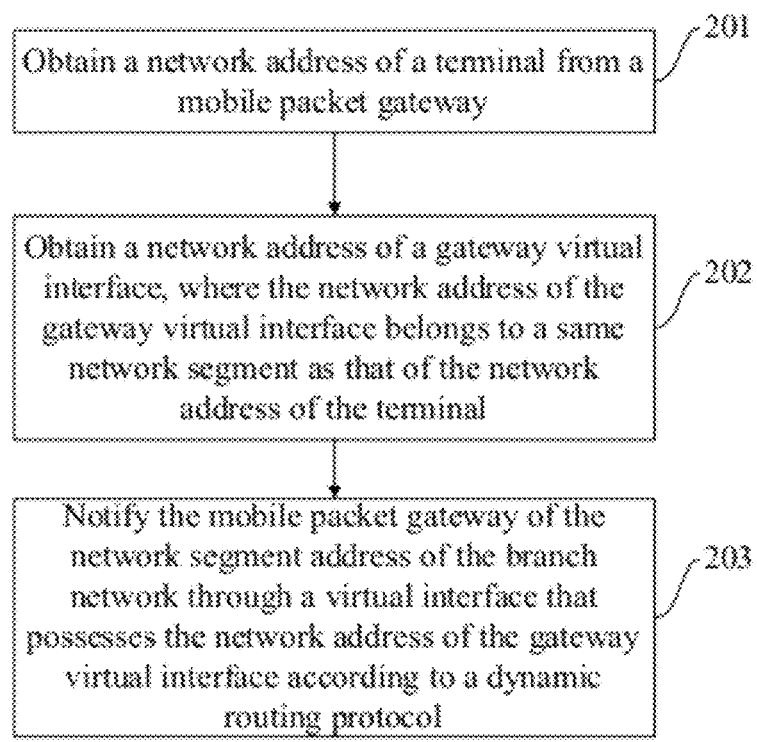
FIG. 2 is a flowchart of another method for mobile VPN communication according to an embodiment of the present invention.

Corresponding to the preceding embodiments, an embodiment of the present invention provides another method for mobile VPN communication. As shown in FIG. 2, the method includes the following steps:

Step 201: An MS obtains a network address of a terminal from a mobile packet gateway.

The MS may send an activation request to the mobile packet gateway, receive an activation response which includes the network address of the terminal and is sent from the mobile packet gateway, and obtain the network address of the terminal from the activation response.

Step 202: The MS obtains a network address of a gateway virtual interface of the mobile packet gateway according to the network address of the terminal, where the network address of the gateway virtual interface and the network address of the terminal belong to a same network segment.

Step 203: The MS notifies the mobile packet gateway of a network segment address of a branch network served by the MS through a virtual interface that possesses the network address of the gateway virtual interface according to a dynamic routing protocol.

In the method for mobile VPN communication provided in this embodiment, the following technical solution is used: the MS notifies a corresponding mobile packet gateway of a latest network segment address of the branch network through the virtual interface according to the dynamic routing protocol in real time. Therefore, the problem that the network segment address of the branch network on the AAA Server needs to be modified manually when the network segment address of the mobile VPN branch network served by the MS changes is prevented. Further, the network maintenance efficiency is increased.

Figure 6:
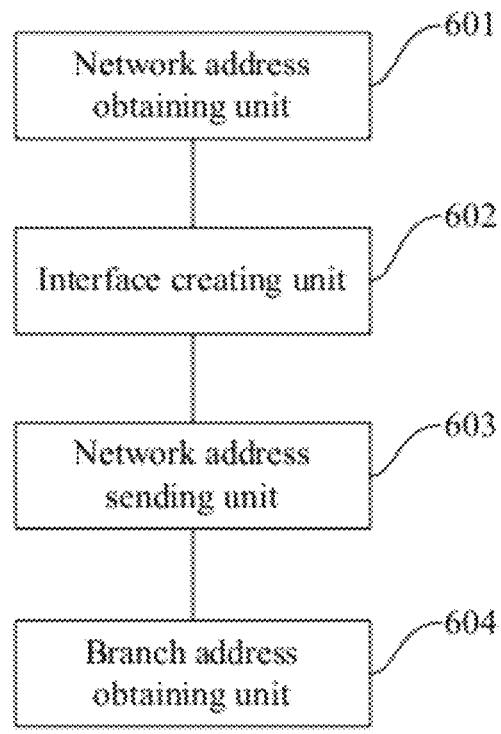
FIG. 6 is a schematic structural diagram of an apparatus for mobile VPN communication according to an embodiment of the present invention.

Corresponding to the method provided in the preceding embodiments, an embodiment of the present invention further provides an apparatus for mobile VPN communication. As shown in FIG. 6, the apparatus for mobile VPN communication includes a network address obtaining unit 601 that is configured to obtain a network address of a terminal and a network address of a gateway virtual interface. The network address of the terminal and the network address of the gateway virtual interface belong to a same network segment.

The network address obtaining unit 601 further includes an address request sending sub-unit that is configured to send an address request message to an AAA Server or a DHCP server. An address response receiving sub-unit is configured to receive an address response message sent from the AAA Server or the DHCP server. A network address obtaining sub-unit is configured to parse the address response message received by the address response receiving sub-unit, and obtain the network address of the terminal and the network address of the gateway virtual interface from the address response message.

Alternatively, the network address obtaining unit 601 further includes a network segment obtaining sub-unit that is configured to obtain a network segment address from a local address pool when the MS enables an MS Router function. A network address determining sub-unit is configured to determine two network addresses from the network segment address obtained by the network segment address obtaining sub-unit, and use one network address as the network address of the terminal and the other one as the network address of the gateway virtual interface.

An interface creating unit 602 is configured to create a virtual interface for a PDP context of the MS according to the network address of the gateway virtual interface obtained by the network address obtaining unit 601.

A network address sending unit 603, configured to send the network address of the terminal obtained by the network address obtaining unit 601 to the MS.

The network address sending unit 603 further includes a response sending sub-unit, configured to send an activation response to the MS, where the activation response includes the network address of the terminal obtained by the network address obtaining unit 601.

A branch address obtaining unit 604, configured to obtain a network segment address of a branch network served by the MS from the MS through the virtual interface created by the interface creating unit 602 according to the dynamic routing protocol.

The branch address obtaining unit 604 further includes a message receiving sub-unit that is configured to receive, through the virtual interface, a dynamic routing protocol message sent from the MS. A network segment address obtaining sub-unit is configured to obtain the network segment address of the branch network from the dynamic routing protocol message received by the message receiving sub-unit. In addition, the branch address obtaining unit 604 further includes an address associating sub-unit, configured to associate the network segment address obtained by the network segment address obtaining unit with the PDP context.

In addition, the apparatus for mobile VPN communication further includes a request receiving unit, configured to receive an activation request from the MS. The apparatus for mobile VPN communication further includes a number of units. A branch topology obtaining unit is configured to obtain a network topology of the branch network from the MS through the virtual interface according to the dynamic routing protocol. A headquarters topology obtaining unit is configured to obtain a network topology of a headquarters network according to the dynamic routing protocol. A headquarters topology notifying unit is configured to notify the MS of the network topology obtained by the headquarters topology obtaining unit through the virtual interface according to the dynamic routing protocol.

The apparatus for mobile VPN communication further includes a monitoring information obtaining unit that is configured to obtain network monitoring information from the MS through the virtual interface. A network quality detecting unit is configured to detect quality of a network with the MS according to the network monitoring information obtained by the monitoring information obtaining unit.

The apparatus for mobile VPN communication provided in this embodiment of the present invention may be a mobile packet gateway, for example, a GGSN.

In the apparatus for mobile VPN communication provided in this embodiment of the present invention, the following technical solution is used: the mobile packet gateway obtains a latest network segment address of the branch network from the MS through the virtual interface according to the dynamic routing protocol in real time. Therefore, the problem that the network segment address of the branch network on the AAA Server needs to be modified manually when the network segment address of the mobile VPN branch network served by the MS changes is prevented. Further, the network maintenance efficiency is increased.

In addition, the mobile packet gateway may obtain the latest network segment address of the branch network from the MS through the virtual interface at any time. Therefore, the problem that the mobile packet gateway can obtain the latest network segment address of the branch network only when the MS is re-activated is also solved. In this way, the operability of the network maintenance is further improved, and the timeliness of the network segment address of the branch network stored in the mobile packet gateway is guaranteed.

Furthermore, the technical solutions of exchanging a dynamic routing protocol message between the mobile packet gateway and the MS and between the mobile packet gateway and the mobile VPN headquarters network may be used to solve the problem of improper traffic configurations due to failure to timely adjust a flow direction of the IP traffic between the mobile VPN branch network and the headquarters network according to the change of the network topology. Therefore, the mobile VPN branch network and the headquarters network may dynamically adjust the flow direction of the IP traffic according to their respective obtained network topologies, thereby making the traffic configuration more reasonable.

Figure 7:
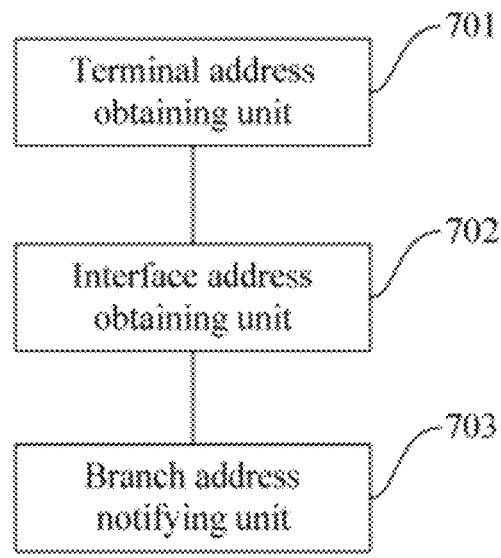
FIG. 7 is a schematic structural diagram of a Mobile Subscriber (MS) according to an embodiment of the present invention.

Corresponding to the foregoing apparatus, an embodiment of the present invention further provides an MS. As shown in FIG. 7, the apparatus for mobile VPN communication includes a terminal address obtaining unit 701 that is configured to obtain a network address of a terminal from a mobile packet gateway. An interface address obtaining unit 702 is configured to obtain a network address of a gateway virtual interface of the mobile packet gateway according to the network address of the terminal obtained by the terminal address obtaining unit 701. The network address of the gateway virtual interface and the network address of the terminal belong to a same network segment. A branch address notifying unit 703 is configured to notify the mobile packet gateway of the network segment address of the served branch network through a virtual interface that possesses the network address of the gateway virtual interface according to a dynamic routing protocol.

The branch address notifying unit 703 further includes: a branch address obtaining sub-unit, configured to obtain the network segment address of the branch network according to the dynamic routing protocol or obtain a pre-configured network segment address of the branch network; an address adding sub-unit, configured to add the network segment address of the branch network to a dynamic routing protocol message; and a message sending sub-unit, configured to send the dynamic routing protocol message to the mobile packet gateway through the virtual interface.

The terminal address obtaining unit 701 further includes: a request sending unit, configured to send an activation request to the mobile packet gateway; and a response receiving unit, configured to receive an activation response which includes the network address of the terminal and is sent from the mobile packet gateway.

The apparatus for mobile VPN communication may further include a number of units. A branch topology obtaining unit is configured to obtain the network segment address of the branch network according to the dynamic routing protocol. A branch topology notifying unit is configured to notify the mobile packet gateway of the network segment address of the branch network through the virtual interface according to the dynamic routing protocol. A headquarters topology obtaining unit is configured to obtain a network topology of a headquarters network from the mobile packet gateway through the virtual interface according to the dynamic routing protocol.

The apparatus for mobile VPN communication may further include a monitoring information obtaining unit that is configured to obtain network monitoring information from the mobile packet gateway through the virtual interface, and a network quality detecting unit that is configured to detect quality of a network with the mobile packet gateway according to the network monitoring information obtained by the monitoring information obtaining unit.

In the MS provided by this embodiment of the present invention, the following technical solution is used: the MS notifies a corresponding mobile packet gateway of a latest network segment address of the branch network through the virtual interface according to the dynamic routing protocol in real time. Therefore, the problem that the network segment address of the branch network on an AAA Server needs to be modified manually when the network segment address of the mobile VPN branch network served by the MS changes is prevented. Further, the network maintenance efficiency is increased.

In addition, the MS may notify the mobile packet gateway of the latest network segment address of the branch network through the virtual interface at any time. Therefore, the problem that the MS can obtain the latest network segment address of the branch network only when the MS is re-activated is also solved. In this way, the operability of the network maintenance is further improved, and the timeliness of the network segment address of the branch network stored in the mobile packet gateway is guaranteed.

Furthermore, the technical solutions of exchanging a dynamic routing protocol message between the mobile packet gateway and the MS and between the mobile packet gateway and the mobile VPN headquarters network may be used to solve the problem of improper traffic configurations due to failure to timely adjust a flow direction of the IP traffic between the mobile VPN branch network and the headquarters network according to the change of the network topology. Therefore, the mobile VPN branch network and the headquarters network may dynamically adjust the flow direction of the IP traffic according to their respective obtained network topologies, thereby making the traffic configuration more reasonable.

Figure 8:
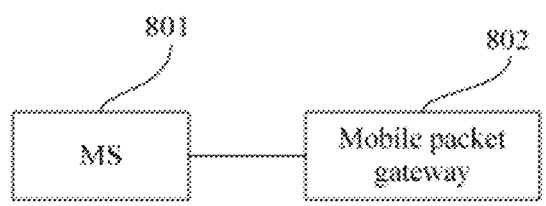
FIG. 8 is a schematic structural diagram of a system for mobile VPN communication according to an embodiment of the present invention.

An embodiment of the present invention further provides a system for mobile VPN communication. As shown in FIG. 8, the system for mobile VPN communication includes at least one MS 801 and a mobile packet gateway 802.

The mobile packet gateway 802 is configured to: obtain a network address of a terminal and a network address of a gateway virtual interface, where the network address of the gateway virtual interface and the network address of the terminal belong to a same network segment; create a virtual interface for a PDP context of the MS 801 according to the network address of the gateway virtual interface; send the network address of the terminal to the MS 801; and obtain, according to a dynamic routing protocol, the network segment address of the branch network served by the MS 801 from the MS 801 through the virtual interface.

The MS 801 is configured to: obtain the network address of the terminal from the mobile packet gateway 802; obtain the network address of the gateway virtual interface of the mobile packet gateway 802 according to the network address of the terminal, where the network address of the gateway virtual interface and the network address of the terminal belong to the same network segment; and notify, according to the dynamic routing protocol, the mobile packet gateway 802 of the network segment address of the served branch network through a virtual interface that possesses the network address of the gateway virtual interface.

Figure 9:
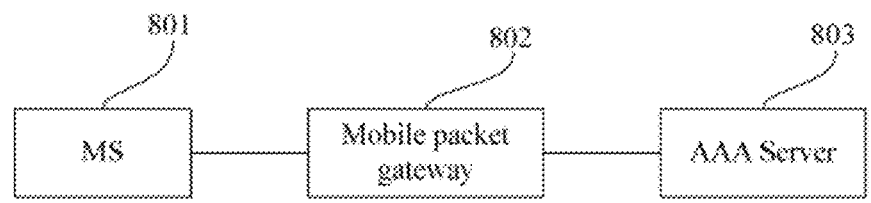
FIG. 9 is a schematic structural diagram of another system for mobile VPN communication according to an embodiment of the present invention.

As shown in FIG. 9, the system for mobile VPN communication may further include an AAA Server 803 that is configured to store the network address of the terminal and the network address of the gateway virtual interface. The mobile packet gateway 802 is further configured to obtain the network address of the terminal and the network address of the gateway virtual interface from the AAA Server 803.

Figure 10:
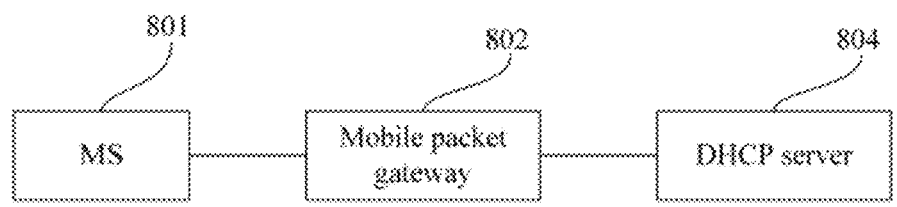
FIG. 10 is a schematic structural diagram of another system for mobile VPN communication according to an embodiment of the present invention.

As shown in FIG. 10, the system for mobile VPN communication may further include a DHCP server 804, which is configured to store the network address of the terminal and the network address of the gateway virtual interface. The mobile packet gateway 802 is further configured to obtain the network address of the terminal and the network address of the gateway virtual interface from the DHCP server 804.

In the system for mobile VPN communication provided in this embodiment of the present invention, the following technical solution is used: the mobile packet gateway obtains a latest network segment address of the branch network from the MS through the virtual interface according to the dynamic routing protocol in real time. Therefore, the problem that the network segment address of the branch network on the AAA Server needs to be modified manually when the network segment address of the mobile VPN branch network served by the MS changes is prevented. Further, the network maintenance efficiency is increased.

In addition, the mobile packet gateway may obtain the latest network segment address of the branch network from the MS through the virtual interface at any time. Therefore, the problem that the mobile packet gateway can obtain the latest network segment address of the branch network only when the MS is re-activated is also solved. In this way, the operability of the network maintenance is further improved, and the timeliness of the network segment address of the branch network stored in the mobile packet gateway is guaranteed.

Furthermore, the technical solutions of exchanging a dynamic routing protocol message between the mobile packet gateway and the MS and between the mobile packet gateway and the mobile VPN headquarters network may be used to solve the problem of improper traffic configurations due to failure to timely adjust a flow direction of the IP traffic between the mobile VPN branch network and the headquarters network according to the change of the network topology. Therefore, the mobile VPN branch network and the headquarters network may dynamically adjust the flow direction of the IP traffic according to their respective obtained network topologies, thereby making the traffic configuration more reasonable.

It is understandable to those skilled in the art that all or part of the steps in the foregoing embodiments may be implemented by a program instructing relevant hardware. The program may be stored in a computer readable storage medium. When the program is executed, the processes of the foregoing methods are executed. The storage medium may be a magnetic disk, a Compact Disk Read-Only Memory (CD-ROM), a Read-Only Memory (ROM) or a Random Access Memory (RAM).

The preceding descriptions are merely exemplary embodiments of the present invention, but not intended to limit the protection scope of the present invention. Any modification, equivalent replacement, or improvement made by persons skilled in the art without departing from the technical scope of the present invention should fall within the protection scope of the present invention. Therefore, the protection scope of the present invention is subject to the appended claims.

What is claimed is:

1. A method for mobile Virtual Private Network (VPN) communication, the method comprising:
   obtaining a network address of a terminal and a network address of a gateway virtual interface, wherein the network address of the gateway virtual interface and the network address of the terminal belong to a same network segment;
   creating a virtual interface for a Packet Data Protocol Context (PDP context) of a Mobile Subscriber (MS) according to the network address of the gateway virtual interface;
   sending the network address of the terminal to the MS; and
   obtaining a network segment address of a branch network served by the MS from the MS through the virtual interface according to a dynamic routing protocol.

2. The method of claim 1, wherein before obtaining the network address of the terminal and the network address of a gateway virtual interface, the method further comprises:
   receiving an activation request from the MS;
   wherein sending the network address of the terminal to the MS comprises sending an activation response that comprises the network address of the terminal to the MS.

3. The method of claim 1, wherein obtaining the network address of the terminal and the network address of the gateway virtual interface comprises:
   sending an address request message to an Authentication Authorization Accounting Server (AAA Server) or a Dynamic Host Configuration Protocol server (DHCP server);
   receiving an address response message sent from the AAA Server or the DHCP server; and
   parsing the address response message to obtain the network address of the terminal and the network address of the gateway virtual interface from the address response message.

4. The method of claim 1, wherein obtaining the network address of the terminal and the network address of the gateway virtual interface comprises:
   obtaining a network segment address from a local address pool when the MS enables an MS router function;
   determining two network addresses from the obtained network segment address; and
   using one network address as the network address of the terminal and the other network address as the network address of the gateway virtual interface.

5. The method of claim 1, wherein obtaining the network segment address comprises:
   receiving, through the virtual interface, a dynamic routing protocol message sent from the MS; and
   obtaining the network segment address of the branch network from the dynamic routing protocol message.

6. The method of claim 5, wherein after obtaining the network segment address of the branch network from the dynamic routing protocol message, the method further comprises:
   associating the network segment address of the branch network with a Packet Data Protocol Context (PDP context).

7. The method of claim 1, wherein after creating the virtual interface, the method further comprises one of the following:
   obtaining a network topology of the branch network from the MS through the virtual interface according to the dynamic routing protocol;
   obtaining a network topology of a headquarters network according to the dynamic routing protocol, and notifying the MS of the network topology of the headquarters network through the virtual interface according to the dynamic routing protocol; and
   obtaining network monitoring information from the MS through the virtual interface, and detecting quality of a network between a mobile packet gateway and the MS according to the network monitoring information.

8. A method for mobile Virtual Private Network (VPN) communication, the method comprising:
obtaining a network address of a terminal from a mobile packet gateway;
obtaining a network address of a gateway virtual interface of the mobile packet gateway according to the network address of the terminal, wherein the network address of the gateway virtual interface and the network address of the terminal belong to a same network segment; and
notifying the mobile packet gateway of a network segment address of a branch network served by a Mobile Subscriber (MS) through a virtual interface that possesses the network address of the gateway virtual interface according to a dynamic routing protocol.

9. The method of claim 8, wherein notifying the mobile packet gateway comprises:
obtaining the network segment address of the branch network according to the dynamic routing protocol, or obtaining a pre-configured network segment address of the branch network; and
sending a dynamic routing protocol message that comprises the network segment address of the branch network to the mobile packet gateway through the virtual interface.

10. The method of claim 8, wherein after obtaining the network address of the gateway virtual interface of the mobile packet gateway, the method further comprises one of the following:
obtaining a network topology of the branch network according to the dynamic routing protocol, and notifying the mobile packet gateway of the network topology of the branch network through the virtual interface according to the dynamic routing protocol;
obtaining a network topology of a headquarters network from the mobile packet gateway through the virtual interface according to the dynamic routing protocol; and
obtaining network monitoring information from the mobile packet gateway through the virtual interface, and detecting quality of a network with the mobile packet gateway according to the network monitoring information.

11. An apparatus for mobile Virtual Private Network (VPN) communication, the apparatus comprising:
a non-transitory computer readable medium having stored therein instructions that, when executed, cause the apparatus to perform:
obtaining a network address of a terminal and a network address of a gateway virtual interface, wherein the network address of the terminal and the network address of the gateway virtual interface belong to a same network segment;
creating a virtual interface for a Packet Data Protocol Context (PDP context) of a Mobile Subscriber (MS) according to the network address of the gateway virtual interface obtained by a network address obtaining unit;
sending the network address of the terminal to the MS; and
obtaining a network segment address of a branch network served by the MS from the MS through the virtual interface according to a dynamic routing protocol.

12. The apparatus of claim 11, wherein the non-transitory computer readable medium further has stored therein instructions for:
receiving an activation request from the MS; and
sending an activation response to the MS, wherein the activation response comprises the network address of the terminal.

13. The apparatus of claim 11, wherein the non-transitory computer readable medium further has stored therein instructions for:
sending an address request message to an Authentication Authorization Accounting Server (AAA Server) or a Dynamic Host Configuration Protocol Server (DHCP server);
receiving an address response message sent from the AAA Server or the DHCP server; and
parsing the received address response message, and obtaining the network address of the terminal and the network address of the gateway virtual interface from the address response message.

14. The apparatus of claim 11, wherein the non-transitory computer readable medium further has stored therein instructions for:
obtaining a network segment address from a local address pool when the MS enables an MS router function; and
determining two network addresses from the obtained network segment address, wherein one network address is used as the network address of the terminal and the other network is used as the network address of the gateway virtual interface.

15. The apparatus of claim 11, wherein the non-transitory computer readable medium further has stored therein instructions for:
receiving through the virtual interface, a dynamic routing protocol message sent from the MS; and
obtaining, the network segment address of the branch network from the dynamic routing protocol message received by a message receiving sub-unit.

16. The apparatus of claim 15, wherein the non-transitory computer readable medium further has stored therein instructions for:
associating the obtained network segment address with the PDP context.

17. The apparatus of claim 11, non-transitory computer readable medium further has stored therein instructions for one of:
obtaining a network topology of the branch network from the MS through the virtual interface according to the dynamic routing protocol;
obtaining a network topology of a headquarters network according to the dynamic routing protocol, and notifying the MS of the network topology obtained by the headquarters topology through the virtual interface according to the dynamic routing protocol; and
obtaining network monitoring information from the MS through the virtual interface, and detecting quality of a network with the MS according to the network monitoring information.

18. The apparatus of claim 11, further comprising a processor configured to execute the instructions.

19. A Mobile Subscriber (MS), comprising:
a non-transitory computer readable medium having stored therein instructions for:
obtaining a network address of a terminal from a mobile packet gateway;
obtaining a network address of a gateway virtual interface of the mobile packet gateway according to the obtained network address of the terminal, wherein the network address of the gateway virtual interface and the network address of the terminal belong to a same network segment; and notifying the mobile packet gateway of a network segment address of a served branch network through a virtual interface that possesses the network address of the gateway virtual interface according to a dynamic routing protocol.

20. The MS of claim 19, wherein the non-transitory computer readable medium further has stored therein instructions for:

obtaining the network segment address of the branch network according to the dynamic routing protocol, or a pre-configured network segment address of the branch network;

adding the network segment address of the branch network to a dynamic routing protocol message; and sending the dynamic routing protocol message to the mobile packet gateway through the virtual interface.

21. The MS of claim 19, wherein the non-transitory computer readable medium further has stored therein instructions for one of:

obtaining the network segment address of the branch network according to the dynamic routing protocol;

notifying the mobile packet gateway of the network segment address of the branch network through the virtual interface according to the dynamic routing protocol;

obtaining a network topology of a headquarters network from the mobile packet gateway through the virtual interface according to the dynamic routing protocol;

obtaining network monitoring information from the mobile packet gateway through the virtual interface; and detecting quality of a network with the mobile packet gateway according to the obtained network monitoring information.

22. The MS of claim 19, further comprising a processor configured to execute the instructions.

23. A system for mobile Virtual Private Network (VPN) communication, comprising;

at least one Mobile Subscriber (MS) having a first non-transitory computer readable medium; and a mobile packet gateway having a second non-transitory computer readable medium, wherein the second non-transitory computer readable medium has stored therein instructions for causing the mobile packet gateway to obtain a network address of a terminal and a network address of a gateway virtual interface, wherein the network address of the gateway virtual interface and the terminal address belong to a same network segment;

to create a virtual interface for a Packet Data Protocol Context (PDP context) of the MS according to the network address of the gateway virtual interface; and to send the network address of the terminal to the MS; and to obtain a network segment address of a branch network served by the MS from the MS through the virtual interface according to a dynamic routing protocol; and wherein the first non-transitory computer readable medium has stored therein instructions for causing the MS to obtain the network address of the terminal from the mobile packet gateway; to obtain the network address of the gateway virtual interface of the mobile packet gateway according to the network address of the terminal, wherein the network address of the gateway virtual interface and the network address of the terminal belong to the same network segment; and to notify the mobile packet gateway of the network segment address of the branch network served by the MS through a virtual interface that possesses the network address of the gateway virtual interface according to the dynamic routing protocol.

24. The system of claim 23, further comprising one of an Authentication Authorization Accounting Server (AAA Server), configured to store the network address of the terminal and the network address of the gateway virtual interface; and a Dynamic Host Configuration Protocol Server (DHCP server), configured to store the network address of the terminal and the network address of the gateway virtual interface;

wherein the instructions stored in the first non-transitory computer readable medium further causes the mobile packet gateway to obtain the network address of the terminal and the network address of the gateway virtual interface from the AAA Server or the DHCP server.

* * * * *

UNITED STATES PATENT AND TRADEMARK OFFICE
CERTIFICATE OF CORRECTION

PATENT NO.      : 9,084,108 B2
APPLICATION NO. : 13/302860
DATED           : July 14, 2015
INVENTOR(S)     : Zhu et al.

It is certified that error appears in the above-identified patent and that said Letters Patent is hereby corrected as shown below:

In the Claims

In Col. 20, lines 51 - 52, claim 17, delete "obtained by the headquarters topology".

Signed and Sealed this
Fifteenth Day of December, 2015

Michelle K. Lee
*Director of the United States Patent and Trademark Office*